(12) United States Patent
Carlsson et al.

(10) Patent No.: US 12,505,683 B1
(45) Date of Patent: Dec. 23, 2025

(54) HYBRID FACE TRACKING FOR VEHICLES (71) Applicant: Distance Technologies Oy, Helsinki (FI)

(72) Inventors: Thomas Carlsson, Vantaa (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/316,192

(22) Filed: Sep. 2, 2025

(51) Int. Cl.
*G06V 20/59* (2022.01)
*G06T 7/73* (2017.01)
*G06V 40/16* (2022.01)
*H04N 23/611* (2023.01)
*H04N 23/695* (2023.01)

(52) U.S. Cl.
CPC .............. *G06V 20/597* (2022.01); *G06T 7/74* (2017.01); *G06V 40/171* (2022.01); *H04N 23/611* (2023.01); *H04N 23/695* (2023.01); *G06T 2207/20076* (2013.01); *G06T 2207/30201* (2013.01); *G06T 2207/30268* (2013.01)

(58) Field of Classification Search
CPC ...... G06V 20/597; G06V 40/171; G06T 7/74; G06T 2207/20076; G06T 2207/30201; G06T 2207/30268; H04N 23/695; H04N 23/611
USPC ......................................................... 348/148
See application file for complete search history.

(56) References Cited

U.S. PATENT DOCUMENTS

| | | | | |
|---|---|---|---|---|
| 9,063,574 | B1* | 6/2015 | Ivanchenko | G06F 1/32 |
| 2012/0293773 | A1* | 11/2012 | Publicover | A61B 3/0008 |
| | | | | 351/210 |
| 2018/0004275 | A1* | 1/2018 | Tubbs | H04N 23/80 |
| 2018/0174457 | A1* | 6/2018 | Taylor | G06N 3/09 |
| 2018/0368074 | A1* | 12/2018 | Gong | H04L 5/14 |
| 2019/0147268 | A1* | 5/2019 | Hayashi | G06V 40/193 |
| | | | | 382/103 |
| 2021/0331628 | A1* | 10/2021 | Liu | B60K 35/29 |
| 2022/0165073 | A1* | 5/2022 | Shikii | B60W 40/09 |
| 2022/0188555 | A1* | 6/2022 | Park | A61B 5/091 |
| 2023/0328364 | A1* | 10/2023 | Jiao | H04N 23/64 |
| 2024/0089405 | A1* | 3/2024 | Deng | H04N 23/90 |
| 2025/0071414 | A1* | 2/2025 | Sugimoto | H04N 23/651 |
| 2025/0209833 | A1* | 6/2025 | Takahashi | G06V 40/168 |

* cited by examiner

*Primary Examiner* — Matthew David Kim
(74) *Attorney, Agent, or Firm* — Ziegler IP Law Group, LLC.

(57) ABSTRACT

At least one monocular camera is installed in a vehicle in addition to in-cabin camera(s). Images captured by the in-cabin camera(s) at a first frame rate are processed to determine first positions of facial landmark features of a user and first poses of the user's face. Images captured by the at least one monocular camera at a second frame rate, higher than the first frame rate, are processed to identify facial landmark features of the user in the second images. Second positions of the facial landmark features are determined at the second frame rate, by correlating the facial landmark features identified in the second images with the first positions of the facial landmark features determined from the first images. Second poses of the user's face are determined at the second frame rate based on the second positions of the facial landmark features and the first poses of the user's face.

15 Claims, 2 Drawing Sheets

HYBRID FACE TRACKING FOR VEHICLES

TECHNICAL FIELD

The present disclosure relates to face tracking; and more particularly, to systems for tracking faces in vehicles. The present disclosure also relates to methods for tracking faces in vehicles.

BACKGROUND

Driver monitoring systems (DMS) and driver attention monitoring (DAM) cameras are increasingly incorporated into vehicles as a result of regulatory requirements such as the EU General Safety Regulation 2019/2144. These systems typically capture facial images and generate face pose information for purposes such as detecting driver drowsiness or inattention.

In parallel, augmented reality (AR) and autostereoscopic heads-up displays (HUDs) rely on accurate and low-latency face and eye tracking in order to present depth-correct visual content to a user. Such HUD applications require high temporal resolution and minimal latency in order to reliably determine a position and orientation of a user's eyes.

Conventional approaches to determine the position and orientation of the user's eyes often rely on stereo disparity techniques, employing two or more high-speed cameras mounted in a rigid and mechanically stable arrangement. While effective for depth estimation, such approaches introduce several challenges. First, the footprint of a stereo camera rig complicates integration into constrained spaces such as an instrument cluster or a dashboard of a vehicle. Second, ensuring mechanical stability adds design complexity. Third, the use of multiple high-speed cameras increases the bill of materials cost, which makes such approaches less suitable for lower-end HUD products.

In light of the foregoing, there is a need for a face tracking system that provides the accuracy and low latency required for AR and autostereoscopic HUD applications, while reducing overall cost, complexity and footprint.

SUMMARY

The present disclosure seeks to provide a system and method for face tracking in vehicles to enable accurate and low-latency determination of face poses for use in augmented reality and autostereoscopic heads-up displays, while reducing cost, complexity, and footprint compared to conventional approaches. The aim of the present disclosure is achieved by a hybrid face tracking system and method that correlate facial landmark features identified in images captured at a first frame rate by at least one in-cabin camera with images captured at a higher second frame rate by at least one monocular camera, to determine accurate face poses at the second frame rate, as defined in the appended independent claims to which reference is made. Advantageous features, including scale factor adjustment, correlation of facial landmark features during periods of pose stability, compensation for shifts in camera support, control of reflective elements for field-of-view alignment, handling of occlusions, probabilistic refinement of potential poses, and integration with a heads-up display, are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
- at least one in-cabin camera installed at a predetermined position and orientation in a vehicle, the in-cabin camera being configured to capture images of a user at a first frame rate;
- at least one monocular camera installed in the vehicle, the at least one monocular camera being configured to capture images of the user at a second frame rate higher than the first frame rate; and
- at least one processor configured to:
  - process first images captured by the at least one in-cabin camera over a given time period, to determine first positions of facial landmark features of the user and first poses of the user's face during the given time period at the first frame rate;
  - process second images captured by the at least one monocular camera over the given time period, to identify facial landmark features of the user in the second images;
  - determine second positions of the facial landmark features at the second frame rate, by correlating the facial landmark features identified in the second images with the first positions of the facial landmark features determined from the first images; and
  - determine second poses of the user's face at the second frame rate based on the second positions of the facial landmark features and the first poses of the user's face during the given time period.

In a second aspect, an embodiment of the present disclosure provides a method comprising:
- processing first images captured by at least one in-cabin camera at a first frame rate over a given time period, to determine first positions of facial landmark features of a user and first poses of the user's face during the given time period at the first frame rate, wherein the at least one in-cabin camera is installed at a predetermined position and orientation in a vehicle;

processing second images captured by at least one monocular camera at a second frame rate over the given time period, to identify facial landmark features of the user in the second images, wherein the at least one monocular camera is installed in the vehicle, the second frame rate being higher than the first frame rate;

determining second positions of the facial landmark features at the second frame rate, by correlating the facial landmark features identified in the second images with the first positions of the facial landmark features determined from the first images; and determining second poses of the user's face at the second frame rate based on the second positions of the facial landmark features and the first poses of the user's face during the given time period.

The present disclosure provides the aforementioned system and the aforementioned method for tracking a user's face in a vehicle, that leverages the first images captured at the first frame rate by the at least one in-cabin camera in combination with the second images captured at the higher second frame rate by the at least one monocular camera, and correlates the facial landmark features identified across the first images and the second images. By correlating the facial landmark features identified in the second images at the higher second frame rate with the first positions of the facial landmark features determined from the first images at the first frame rate, the system and method enable scale correction of the facial landmark features identified in the second images and determination of the second poses of the user's face at a higher temporal resolution of the at least one monocular camera. In this way, the system and method provide high-frequency, low-latency face tracking that is suitable for use in augmented reality (AR) and autostereoscopic heads-up displays (HUDs).

The system and method provide the accuracy and low latency by anchoring the second positions of the facial landmark features determined at the higher second frame rate to the first positions of the facial landmark features determined at the first frame rate. In this regard, the first positions of the facial landmark features and the first poses of the user's face are utilised as a metrically-scaled reference, ensuring that the second positions of the facial landmark features and the second poses of the user's face are determined with both high temporal fidelity and reliable depth accuracy. Unlike conventional stereo disparity approaches that require two or more high-speed cameras, the present disclosure achieves comparable accuracy with even a single high-speed monocular camera supplemented by pose information already available from the at least one in-cabin camera. This avoids the need for rigid stereo rigs, thereby solving the mechanical stability problem inherent in conventional face tracking systems. It will be appreciated that in some implementations, the at least one monocular camera is a single monocular camera; in such implementations, embodiments of the present disclosure achieve particular technical benefits. In other implementations, the at least one monocular camera is a plurality of monocular cameras; in these implementations, embodiments of the present disclosure remain technically advantageous.

Furthermore, the system and method reduce the hardware footprint and integration complexity, as the at least one monocular camera may be placed flexibly within constrained spaces such as an instrument cluster or dashboard of the vehicle, without requiring a second high-speed camera and associated mechanical support. By limiting the design to a single high-speed camera and reusing the at least one in-cabin camera already present in the vehicle for purposes such as regulatory driver or passenger monitoring, driver or passenger detection, rear seat monitoring, gesture control, interior security, or facial recognition, the overall bill of materials cost is reduced, making the present solution practical even for lower-end HUD products.

In summary, the system and method disclosed herein simultaneously solve the problems of high latency, unreliable monocular depth estimation, large footprint, mechanical complexity, and cost inefficiency that are associated with conventional stereo-based face tracking systems, while enabling accurate, low-latency face pose determination required for AR and autostereoscopic HUD applications.

For illustration purposes only, there will now be described how the aforementioned steps can be performed pursuant to embodiments of the present disclosure.

Processing First Images Captured by in-Cabin Camera:

The first images are captured by the at least one in-cabin camera that is already present in the vehicle for purposes such as regulatory driver or passenger monitoring, driver or passenger detection, rear seat monitoring, gesture control, interior security, or facial recognition. Such in-cabin cameras typically have a relatively low frame rate (referred to as the first frame rate throughout the present disclosure), making them alone unsuitable for low-latency face pose determination required for AR and autostereoscopic HUD applications.

In some implementations, the at least one in-cabin camera comprises a single in-cabin camera. In other implementations, the at least one in-cabin camera comprises two or more cameras arranged as part of a stereo original equipment manufacturer (OEM) setup, thereby enabling depth estimation of detected faces. In additional or alternative implementations, the at least one in-cabin camera comprises a plurality of cameras installed at predetermined positions and orientations inside the vehicle.

The at least one in-cabin camera may be positioned in a fixed and mechanically stable location, such as near a rear-view mirror, a centre console, or overhead within a cabin of the vehicle. The at least one in-cabin camera may comprise at least one of: at least one visible-light camera, at least one infrared (IR) camera, at least one depth camera. The first frame rate may, for example, lie in a range of 30 to 90 frames per second; more typically, in a range of 30 to 60 frames per second.

Each first image may be processed by extracting features from the image and identifying facial landmark features from among the extracted features, using suitable algorithms and/or trained machine learning models such as convolutional neural networks (CNNs), Active Appearance Models, or regression forests. Facial landmark features are well-known in the art, and refer to key points or landmarks on a face. Examples of the facial landmark features include, without limitation, corners of the eyes, pupils, eyebrows, a tip of the nose, corners of the mouth, and points along contours of the face.

The first positions of the facial landmark features are determined from the facial landmark features identified from the first images, and are expressed either as two-dimensional (2D) positions in an image plane of the at least one in-cabin camera or, in the case of stereo or depth-capable in-cabin cameras, as three-dimensional (3D) positions in a local coordinate space referenced to the interior of the vehicle. These first positions may optionally be re-expressed relative to an image plane of a HUD for later processing.

Using the first positions of the facial landmark features, the first poses of the user's face may be determined using a model-based face pose estimation technique. For example, the first positions may be mapped to a 3D morphable model (such as a mesh-based morphable model) of a human face, and a six-degree-of-freedom (6DoF) face pose may be estimated using techniques such as Perspective-n-Point (PnP) solving, Procrustes alignment, or iterative closest point fitting. Each first position and each first pose is timestamped and stored for later correlation with the second images captured by the at least one monocular camera.

Processing Second Images Captured by Monocular Camera:

The second images are captured by the at least one monocular camera, which can be placed flexibly at a suitable location inside the vehicle, such as on or near a steering column, within an instrument cluster, or integrated into a dashboard, provided that a field of view of the at least one monocular camera captures the user's face. The at least one monocular camera operates at a higher frame rate (referred to as the second frame rate throughout the present disclosure) to support low-latency face pose determination required for AR and autostereoscopic HUD applications. The second frame rate may, for example, lie in a range of 90 to 300 frames per second; more optionally, in a range of 120 to 300 frames per second; yet more optionally, in a range of 240 to 300 frames per second. The at least one monocular camera may comprise at least one of: at least one visible-light camera, at least one IR camera, at least one depth camera, or at least one hybrid camera having a sensor chip that includes a combination of at least two of: colour pixels, IR pixels, depth pixels. The at least one monocular camera may employ exposure control and gain control suitable for high-speed operation. In IR implementations, a band-pass filter and eye-safe IR illumination may be used to improve landmark detection robustness under varying cabin lighting.

The at least one monocular camera is calibrated with respect to its intrinsic parameters (such as focal length, principal point, lens distortion) and has extrinsic parameters that are pre-known or pre-determined with respect to the local coordinate space referenced to the interior of the vehicle and/or the image plane of the HUD. Intrinsic calibration may be performed using standard procedures (e.g., checkerboard-based or circle-grid calibration with a Brown-Conrady or equivalent distortion model). Extrinsic calibration may be performed during installation or via in-vehicle calibration procedures, and a resulting transformation enables later re-expression of the identified facial landmark features into a common coordinate space during correlation. Hardware or driver-level timestamping (e.g., monotonic SoC clock, PTP/gPTP-synchronised time base, or sensor-provided frame counters) can be used so that each second image is associated with a precise capture time.

Each second image is processed to identify facial landmark features of the user in an image plane of a corresponding monocular camera. Such processing may include: (i) face detection to obtain a region of interest (ROI); (ii) facial landmark identification in the ROI using well-known algorithms and/or trained machine-learning models (e.g., convolutional neural networks, heat-map regression, or lightweight landmark regressors suitable for high-rate inference). For real-time operation at the second frame rate, ROI tracking (e.g., correlation tracking or optical-flow-assisted ROI updates) may be used between full face-detection passes to reduce computational load while maintaining accuracy. Notably, the facial landmark features identified in the second images do not necessarily match fully with the facial landmark features identified in the first images, due to difference in their positioning and orientation inside the vehicle.

The facial landmark features identified in the second images are represented as 2D positions in the image plane of the corresponding monocular camera (or in an equivalent unscaled local coordinate space of the corresponding monocular camera). The facial landmark features can be accompanied by per-landmark confidence values and an image-frame timestamp. Because the at least one monocular camera does not directly provide metric scale, these 2D positions are unscaled at this stage and do not yet constitute the second positions. The facial landmark features, their confidence values, and their timestamps are buffered over the given time period for subsequent correlation with the first positions determined from the first images, as described in the following step. It will be appreciated that the given time period may be implemented as a sliding time window, which is a well-known technique in the art.

Determining Second Positions of Facial Landmark Features at Second Frame Rate:

The facial landmark features identified from the second images of the at least one monocular camera are correlated with the first positions of the facial landmark features determined from the first images of the at least one in-cabin camera, in order to resolve metric scale and establish 3D positions of the facial landmark features at the second frame rate. The resulting 3D positions are referred to as the second positions of the facial landmark features throughout the present disclosure.

The correlation may be enabled by temporally aligning the facial landmark features identified in the second images with the first positions of the facial landmark features determined from the first images, over the given time period. Such alignment may be performed using timestamps associated with the first images and the second images. This ensures that the facial landmark features from both cameras within a sliding time window (for example, 0.5 to 1.0 seconds) are correlated.

In some implementations, the correlation process may further be conceptualised as a loop-closure step, analogous to Simultaneous Localisation and Mapping (SLAM) frameworks. In this analogy, the first poses and the first positions derived from the at least one in-cabin camera provide absolute reference anchors, while the second positions derived from the at least one monocular camera provide high-rate but scale-ambiguous observations. Treating their correlation as a loop closure allows the system to resolve accumulated drift and latency mismatches between the at least one monocular camera and the at least one in-cabin camera, in a manner similar to error correction in SLAM. By applying such loop closure principles within the sliding time window, the system achieves temporally stable second positions despite asynchronous latencies between the at least one monocular camera and the at least one in-cabin camera. In this regard, the loop closure not only resolves drift but also harmonises differences in latency between the at least one monocular camera and the at least one in-cabin camera, ensuring that the second positions remain consistent and temporally aligned despite heterogeneous update rates.

In some implementations, the correlation process may be combined with on-the-fly recalibration of the at least one monocular camera or the at least one in-cabin camera. As an example, the at least one processor may be configured to detect a systematic misalignment between the first positions and the facial landmark features identified in the second images; and adjust the extrinsic parameters of the at least one monocular camera or update transformation parameters between the at least one monocular camera and the at least one in-cabin camera. Such recalibration may be performed opportunistically during the correlation process, thereby compensating for drift, installation tolerances, or gradual mechanical changes inside the vehicle. This enables the system to maintain consistent accuracy over time without requiring manual recalibration. In this regard, recalibration techniques described in U.S. patent application Ser. No. 18/656,167, titled "On-the-fly Recalibration of Tracking Camera" may optionally be adapted and applied within the present system, particularly for maintaining accurate extrinsic calibration between the cameras over extended operation.

Once temporal alignment is achieved, the facial landmark features identified in the second images are mapped into a coordinate space that is common with the first positions of the facial landmark features. An optimisation process may then be performed to compute a transformation that aligns the facial landmark features identified in the second images with the first positions of the facial landmark features. Such transformation may include a scale factor, translation, and rotation. Optimisation techniques such as Levenberg-Marquardt, Gauss-Newton, or equivalent non-linear least squares solvers may be used to minimise the differences between the facial landmark features identified in the second images and the first positions of the facial landmark features. In some implementations, the confidence values associated with the facial landmark features may be used to reduce the influence of facial landmark features identified with lower reliability.

The output of this correlation process is the second positions of the facial landmark features, expressed as 3D coordinates determined at the second frame rate. The second positions combine the higher temporal resolution of the second images with the metric accuracy of the first positions. The second positions are timestamped and stored for use in determining the second poses of the user's face in the following step.

Determining Second Poses of User's Face at Second Frame Rate:

The second poses of the user's face at the second frame rate are determined using the second positions of the facial landmark features together with the first poses of the user's face determined from the first images over the given time period. This enables accurate 6DoF estimation of the pose of the user's face at the higher temporal resolution of the at least one monocular camera, while maintaining metric accuracy provided by the at least one in-cabin camera.

In some implementations, the second positions of the facial landmark features are applied to a 3D morphable model of a human face, and a pose estimation algorithm such as Perspective-n-Point (PnP) solving, Procrustes alignment, or iterative closest point fitting is used to determine the second pose of the user's face for each frame of the at least one monocular camera. The first poses of the user's face determined from the first images serve as a metrically scaled reference, constraining the optimisation and preventing drift or instability in the potential second pose estimates obtained from the second positions alone.

In further implementations, a filtering process may be applied to combine the second positions and the first poses. For example, a Kalman filter, an extended Kalman filter, or a particle filter may be configured such that the second positions of the facial landmark features provide high-rate measurement updates, while the first poses provide lower-rate but metrically scaled corrections. This allows the second poses to reflect both the rapid responsiveness of the second images and the metric stability of the first images.

The output of this process is the second poses of the user's face, determined at the second frame rate. Each second pose may comprise a 3D translation vector and a 3D rotation representation (for example, Euler angles, axis-angle, or quaternion). In other words, the term "pose" encompasses both position and orientation. The second poses are timestamped and stored for use in subsequent processing stages, for example, determination of relative positions of the user's eyes with respect to the image plane of the HUD.

Moreover, in some implementations, the at least one processor is configured to select the given time period as a time period during which the first poses of the user's face vary by less than a predefined threshold change. Such a selection may be performed by monitoring successive first poses of the user's face determined from the first images and calculating a variation in the first poses over time, for example, angular difference in orientation or translational displacement of a reference point of the user's face. When the calculated variation remains below the predefined threshold change for a pre-specified duration, the corresponding time period is selected as the given time period for correlation.

The selection of such stable time periods may be implemented by applying weighting during the optimisation process that correlates the facial landmark features identified in the second images with the first positions of the facial landmark features. In particular, higher weights may be assigned to correspondences between facial landmark features from stable time periods, while lower weights may be assigned to correspondences during time periods where the first poses exhibit larger variations. This improves the reliability of the transformation computed during correlation and reduces the effect of unstable measurements.

Selecting the time period during which the first poses of the user's face vary by less than the predefined threshold change provides several technical benefits. By focusing correlation on stable time periods, the system reduces the effect of timestamp jitter, sensor latency, and rapid head movement, which can otherwise degrade accuracy. This improves robustness of the second positions of the facial landmark features determined at the second frame rate.

The stability-based selection also enhances the efficiency of the optimisation process. When applied during optimisation as weighting, it allows faster convergence and reduces computational load, while lowering the risk of incorrect alignment or divergence. The resulting second positions are therefore determined with greater reliability and consistency, which supports accurate, low-latency tracking suitable for AR and autostereoscopic HUD applications.

Furthermore, optionally, the at least one processor is configured to adjust a scale factor applied to the second positions of the facial landmark features, based on the correlation between the second positions of the facial landmark features determined from the second images and the first positions of the facial landmark features determined from the first images. The scale factor may be computed by comparing distances between pairs of the second positions of the facial landmark features with distances between corresponding pairs of the first positions of the facial landmark features. The ratio of these distances provides an estimate of the scale factor.

The scale factor may be applied to the second positions to ensure that they remain metrically consistent with the first positions. Notably, the adjusted scale factor is applied to the second positions before they are used to determine the second poses of the user's face, thereby ensuring that the second poses are based on metrically accurate positions of the facial landmark features.

In some implementations, the scale factor is updated adaptively over time as new correlations are performed. For example, the scale factor may be re-computed during different correlations and updated using a running average or exponential smoothing method. This prevents sudden changes caused by noise and provides gradual correction of scale drift. In additional implementations, the scale factor may be computed selectively from facial landmark features having relatively higher confidence values. Some examples of such facial landmark features are the tip of the nose and the corners of the eyes. Such selective computation of the scale factor improves robustness.

Adjusting the scale factor applied to the second positions of the facial landmark features provides multiple technical benefits. First, it prevents scale drift of the second positions, ensuring that they remain anchored to the metrically scaled reference provided by the first positions. This improves the depth accuracy of the face tracking system.

Second, adaptive adjustment of the scale factor increases robustness under real-world conditions, including sensor noise, calibration shifts, or lighting variations that may affect monocular tracking accuracy. By refining the scale factor repeatedly, the system maintains consistent alignment between the second positions and the first positions of the facial landmark features.

Third, applying a corrected scale factor improves the stability of second pose estimation, since the second poses are derived directly from the second positions. Without scale adjustment, small errors in depth scaling would propagate into inaccurate face and eye position estimates, leading to degraded performance in AR and autostereoscopic HUD applications. By ensuring metrically accurate second positions, the system enables more reliable and consistent second poses, which support accurate, low-latency rendering of HUD content.

In summary, the scale factor adjustment improves accuracy, stability, and robustness of the second positions and second poses, thereby enhancing the overall reliability and performance of the face tracking system in vehicle environments.

Moreover, optionally, the at least one monocular camera is mounted on an adjustable support in the vehicle. In such a case, the at least one processor is configured to:
  detect when the second positions of the facial landmark features have shifted by more than a predefined threshold shift within a time period shorter than a predefined time period, by correlating the facial landmark features identified in the second images with the first positions of the facial landmark features determined from the first images; and
  when it is detected that the second positions of the facial landmark features have shifted by more than the predefined threshold shift within the time period shorter than the predefined time period,
    determine an amount of at least one of: a tilt of the adjustable support, a translation of the adjustable support, based on a magnitude and a direction of the shift detected in the second positions of the facial landmark features; and
    correct the second positions of the facial landmark features, prior to determining the second poses of the user's face, based on the amount of the at least one of: the tilt, the translation of the adjustable support.

Shifting of the second positions by more than the predefined threshold shift within a shorter time period than the predefined time period indicates a sudden displacement of the second positions beyond the predefined threshold shift. The adjustable support may, for example, be a steering column of the vehicle, a steering wheel of the vehicle, or a bracket mounted on a seat of the vehicle. It will be appreciated that although an on-board diagnostics (OBD) system of the vehicle may be capable of providing an estimate of a current pose of the steering column, tolerance drifts, calibration errors, or other mechanical variances may nevertheless arise. In such cases, correction for these factors may be performed to maintain the metric accuracy of the second positions and ensure optimal performance of the face tracking system.

A tilt of the adjustable support pertains to a rotational displacement of the at least one monocular camera, for example corresponding to a change in roll, pitch, or yaw relative to one or more axes of the adjustable support. A translation of the adjustable support pertains to a linear displacement of the at least one monocular camera, for example corresponding to a longitudinal displacement of the at least one monocular camera along a longitudinal axis of the adjustable support, a vertical displacement of the at least one monocular camera along a vertical axis, or a lateral displacement of the at least one monocular camera along a lateral axis of the adjustable support. In implementations where the at least one monocular camera is a plurality of monocular cameras, different monocular cameras may be installed at different positions inside the vehicle. As an example, a first one of the plurality of monocular cameras may be mounted on a first adjustable support, while a second one of the plurality of monocular cameras may be mounted on a second adjustable support. As another example, at least one of the plurality of monocular cameras may be mounted on the adjustable support, while at least one other of the plurality of monocular cameras may be mounted on a non-adjustable support.

The amount of the tilt or translation of the adjustable support may be determined by correlating the second positions of the facial landmark features identified in the second images with the first positions of the facial landmark features determined from the first images, and quantifying a systematic displacement of the second positions relative to the first positions over the shorter time period. The correction may be performed by applying a geometric transformation to the second positions of the facial landmark features, the geometric transformation including at least one of: a rotation matrix corresponding to the tilt of the adjustable support, a translation vector corresponding to the translation of the adjustable support.

The corrected second positions of the facial landmark features are then used for determining the second poses of the user's face. In this way, any changes in the physical configuration of the at least one monocular camera caused by adjustment of the adjustable support are compensated, ensuring that the corrected second positions are consistent with the first positions of the facial landmark features before being used in subsequent second pose estimation.

Detecting and correcting for shifts in the second positions of the facial landmark features relative to the first positions provides several technical benefits. First, it prevents systematic errors in the second positions that would otherwise arise when the at least one monocular camera is repositioned due to movement of the adjustable support. This ensures that the second positions remain consistent with the first positions of the facial landmark features.

Second, determining the amount of tilt or translation of the adjustable support based on the magnitude and direction of the detected shift allows the system to correct the second positions accurately before they are used to determine the second poses of the user's face. This maintains the metric accuracy required for robust and low-latency tracking.

Third, by correcting the second positions of the facial landmark features prior to second pose estimation, the system reduces the need for manual recalibration of the at least one monocular camera whenever the adjustable support is changed. This lowers integration complexity and improves usability in vehicles where adjustable supports are frequently repositioned, such as those integrated with steering columns.

In summary, detecting and compensating for tilt or translation of the adjustable support improves accuracy, stability, and robustness of the second positions and the second poses, thereby ensuring reliable face tracking performance for AR and autostereoscopic HUD applications under varying support conditions.

Furthermore, in some implementations, the system further comprises a controllable reflective element arranged on an optical path of the at least one monocular camera, wherein the at least one processor is configured to control an orientation of the controllable reflective element relative to the at least one monocular camera, to adjust the optical path of the at least one monocular camera and maintain the user's face within a field of view of the at least one monocular camera.

The controllable reflective element may be positioned so that it intercepts and directs the optical path of the at least one monocular camera toward the user's face. The controllable reflective element may comprise, for example, a motor-actuated mirror, a galvanometer mirror, a microelectromechanical system (MEMS) mirror, or another steerable reflective component. In implementations where the at least one monocular camera is a plurality of monocular cameras, different controllable reflective elements may be employed for respective ones of the plurality of monocular cameras.

The orientation of the controllable reflective element may be controlled using electronic drive signals to an actuator coupled to the controllable reflective element. The at least one processor may be configured to determine a target orientation of the controllable reflective element based on at least one of: the first positions of the facial landmark features, the second positions of the facial landmark features, the first poses of the user's face, the second poses of the user's face. Additionally, the target orientation may be determined based on the shift detected in the second positions due to the tilt and/or translation of the adjustable support.

When the user's face begins to move toward an edge of the field of view of the at least one monocular camera, the orientation of the controllable reflective element is controlled to shift the user's face towards a central portion of the field of view. This redirects the optical path of the at least one monocular camera so that the user's face remains within the field of view. The orientation of the controllable reflective element may be controlled incrementally, in real time, based on repeated monitoring of the positions and/or poses of the user's face.

The orientation of the controllable reflective element may be adjusted about one axis (e.g., yaw), two axes (e.g., yaw and pitch), or multiple axes, depending on a current setting of the adjustable support of the at least one monocular camera. Calibration of the controllable reflective element with respect to the at least one monocular camera may be performed so that angular changes in the orientation of the controllable reflective element result in predictable adjustments of the optical path of the at least one monocular camera.

Incorporating a controllable reflective element on the optical path of the at least one monocular camera provides several technical benefits. First, it allows the at least one monocular camera to maintain the user's face within its field of view without requiring the at least one monocular camera itself to be physically repositioned. This reduces mechanical complexity and improves reliability of the system by limiting moving parts.

Second, controlling the orientation of the controllable reflective element in real time enables the optical path of the at least one monocular camera to adapt dynamically to user motion inside the cabin. This ensures that the second images continue to capture the user's face reliably, thereby preventing interruptions in the determination of the second positions and the second poses of the user's face.

Third, the controllable reflective element provides a space-efficient way of extending the effective field of view of the at least one monocular camera, which is particularly valuable in constrained spaces such as an instrument cluster or a dashboard. This supports integration of the system into vehicles without requiring a wide-angle monocular camera that would otherwise increase distortion and reduce resolution.

Fourth, maintaining the user's face within the field of view of the at least one monocular camera ensures continuous availability of high-temporal-resolution second images of the user's face, which is critical for low-latency face pose tracking in AR and autostereoscopic HUD applications. Without such a mechanism, head movement by the user or a change in the tilt/translation of the adjustable support could move the user's face out of the field of view of the at least one monocular camera, causing tracking interruptions.

In summary, controlling the orientation of the controllable reflective element arranged on the optical path of the at least one monocular camera improves robustness, continuity, and integration flexibility of face tracking in vehicles, ensuring that the system delivers reliable, low-latency performance for AR and autostereoscopic HUD applications even when the user moves within the cabin.

In an alternative implementation, the at least one monocular camera is mounted on a controllable gimbal in the vehicle. Optionally, in such implementations, the at least one processor is configured to control an orientation of the gimbal to adjust the field of view of the at least one monocular camera and maintain the user's face within the field of view.

The controllable gimbal may provide at least one degree of freedom of rotation, for example yaw, pitch, or both. The gimbal may include motorized actuators or servos, and its orientation may be electronically controlled by the at least one processor. The at least one processor may be configured to determine a target orientation of the gimbal based on at least one of: the first positions of the facial landmark features, the second positions of the facial landmark features, the first poses of the user's face, the second poses of the user's face.

When the user's face begins to move toward the edge of the field of view of the at least one monocular camera, control signals are generated to actuate the gimbal, reorienting the at least one monocular camera so that the user's face is re-centred within the field of view. The gimbal may be integrated with a steering column or a dashboard assembly, enabling the at least one monocular camera to remain aligned with the user's face even when the adjustable support is moved. Calibration of the gimbal relative to the coordinate space of the vehicle may be performed so that angular adjustments correspond to predictable changes in the at least one monocular camera's optical axis.

Mounting the at least one monocular camera on the controllable gimbal provides several technical benefits. First, unlike reflective element implementation, the gimbal reorients the at least one monocular camera itself, ensuring that the optical path remains unobstructed and minimizing additional optical elements. Second, by continuously re-centring the monocular camera's field of view on the user's face, the system prevents loss of tracking even when the user moves significantly within the cabin. Third, in vehicles where the at least one monocular camera is mounted on adjustable supports such as a steering column, the gimbal actively compensates for these adjustments, reducing or eliminating the need for manual recalibration. Fourth, a gimbal-mounted monocular camera provides flexibility in packaging within tight spaces such as an instrument cluster or dashboard, without requiring wide-angle lenses that reduce effective resolution. Fifth, because the gimbal is processor-controlled, face tracking remains continuous and stable, supporting low-latency AR and autostereoscopic HUD rendering.

In summary, the gimbal-mounted monocular camera implementation provides an alternative to optical-path redirection, ensuring that the user's face remains reliably within the field of view while minimizing optical complexity, maintaining spatial fidelity, and supporting accurate low-latency face tracking in vehicle environments.

Moreover, optionally, the at least one processor is configured to:
 detect when the at least one monocular camera is occluded; and
 when it is detected that the at least one monocular camera is occluded, perform at least one of:
  predicting third poses of the user's face based on the first poses of the user's face determined from the first images;
  refining at least one of: the first positions of the facial landmark features of the user, the first poses of the user's face, based on previously-collected information indicative of at least one of: a size of the user's head, a shape of the user's face, an average distance of the user's face from the at least one in-cabin camera.

Such occlusion may be detected based on a sudden drop in confidence values of the facial landmark features identified in the second images, or by monitoring for a persistent absence of the user's face within the field of view of the at least one monocular camera. Occlusion may also be detected when the second images show insufficient contrast or texture to identify the facial landmark features reliably, for example when the at least one monocular camera is blocked by an object, a hand, or a change in cabin lighting.

Prediction of the third poses may be performed by interpolating or extrapolating a trajectory of the first poses of the user's face over time. Such interpolation or extrapolation may, for example, be performed using motion models such as constant-velocity or constant-acceleration models. This allows the system to estimate how the user's face continues to move even when the second images are unavailable due to occlusion.

In some implementations, during persistent occlusion of the at least one monocular camera, the system falls back to using only the at least one in-cabin camera for determining the first positions and the first poses of the user's face, with predictions extending further into the future to maintain continuity. Although such fallback reduces temporal fidelity compared to the second frame rate, it ensures uninterrupted functionality of the system until the at least one monocular camera regains visibility.

Refinement of at least one of the first positions or the first poses may be performed by constraining them with anthropometric information collected previously about the user's face. By using such previously-collected information, the accuracy of the first positions and the first poses is increased while the at least one monocular camera remains occluded. In a case where both the prediction and the refinement are performed, the refinement is performed prior to the prediction. This improves the performance of the system during occlusion of the at least one monocular camera.

Detecting when the at least one monocular camera is occluded and compensating for the occlusion provides several technical benefits. First, it ensures that face tracking continues reliably even when the at least one monocular camera temporarily loses visibility of the user's face, thereby preventing interruptions in determining the poses of the user's face.

Second, predicting the third poses of the user's face based on the first poses provides continuity of tracking at the second frame rate, despite the absence of usable second images. This avoids sudden latency spikes or failures in HUD rendering that could occur if the system paused during occlusion.

Third, refining the first positions and the first poses based on the previously-collected anthropometric information about the user's head size, the face shape, or the average distance ensures that the face tracking remains metrically accurate even when only the first images are available. This improves robustness under real-world conditions, such as when the at least one monocular camera is temporarily blocked by the user's hand, steering wheel adjustments, or lighting changes.

In summary, the system maintains accurate and continuous face tracking by detecting occlusion of the at least one monocular camera and compensating through prediction and/or refinement. This enhances the resilience, accuracy, and stability of the system, ensuring reliable low-latency tracking for AR and autostereoscopic HUD applications under conditions where the at least one monocular camera alone would otherwise fail.

Furthermore, optionally, when determining the second poses of the user's face, the at least one processor is configured to:
 estimate a plurality of potential second poses of the user's face based on the second positions of the facial landmark features; and
 select a subset of the plurality of potential second poses of the user's face as the second poses of the user's face, based on the first poses of the user's face determined from the first images.

The plurality of potential second poses may arise because monocular estimation of the second poses from the second positions can admit multiple solutions, such as mirror-symmetric orientations or ambiguous depth configurations. These potential second poses are estimated by applying pose estimation techniques such as Perspective-n-Point solving, Procrustes alignment, or iterative fitting of the second positions of the facial landmark features to a 3D morphable model of a human face. Each estimation may result in a possible second pose that is consistent with the second positions within a defined error tolerance.

When selecting the subset of the plurality of potential second poses of the user's face, the first poses provide a metrically accurate and temporally stable reference, enabling the system to discard spurious or physically implausible second poses. For example, if the first poses indicate that the user's face orientation has changed smoothly over time, potential second poses inconsistent with this trajectory are eliminated.

In cases of partial occlusion of the user's face in the second images, or in situations where glare or adverse lighting conditions reduce the quality of the second images, the face tracking algorithm may lack enough second positions to uniquely determine a second pose for a particular instant, leaving multiple equally likely potential second poses. For example, the face tracking algorithm may assign probabilities to potential second poses as follows: 40% to Pose A, 32% to Pose B, 28% to Pose C. Even though these potential second poses appear equally probable using the second positions alone, the first poses can be used to constrain the outcome. If the first poses indicate that Pose A is implausible (0% probability) and Pose C is highly unlikely (10% probability), it can be concluded that Pose B is the correct second pose.

The selected subset of second poses is then used as the valid second poses of the user's face for subsequent processing, such as determining the relative positions of the user's eyes with respect to the image plane of the HUD.

Estimating the plurality of potential second poses and selecting among them based on the first poses provides important technical benefits. First, it resolves pose ambiguities that arise from monocular estimation of the second positions, preventing erroneous interpretations of face position and orientation.

Second, by constraining the selection with the first poses, the second poses remain metrically accurate and temporally consistent with the user's actual movement. This avoids sudden jumps, mirror flips, or discontinuities that could otherwise degrade the reliability of pose tracking.

Third, the approach improves robustness under noisy conditions, such as partial occlusion, glare, or reduced image quality. By evaluating the potential second poses against the first poses, the system ensures that the selected poses are both geometrically plausible and consistent with the first poses.

In summary, this approach enhances accuracy, stability, and robustness of the second pose determination by resolving monocular ambiguities and constraining the pose selection with the first poses. This enables reliable and low-latency face tracking suitable for AR and autostereoscopic HUD applications, even when the second positions alone are insufficient to uniquely determine the user's face pose.

In practice, the potential second poses are not singular pose options but rather modalities in a probability cloud, and information from the first poses is used to rule out significant parts of the probability cloud, thereby converging to the correct second poses. Optionally, in this regard, the plurality of potential second poses of the user's face are estimated in a form of a probability cloud, wherein each potential second pose in the probability cloud is assigned a probability of said potential second pose being a correct second pose of the user's face at a given instant of time. In such a case, when determining the second poses of the user's face, the at least one processor is configured to:

assign a corresponding weight to a probability of each potential second pose, based on whether said potential second pose matches a corresponding first pose of the user's face for a same time instant or a nearest time instant;

calculate a weighted probability of each potential second pose, based on the corresponding weight and the probability of said potential second pose; and when selecting the subset of the plurality of potential second poses of the user's face, select potential second poses having a highest weighted probability from amongst respective weighted probabilities of the plurality of potential second poses.

Such probabilities may be computed during determination of the second poses by evaluating how well each potential second pose aligns with the second positions of the facial landmark features within an error tolerance. In practice, this approach allows the system to combine the probabilities derived from the second positions of the facial landmark features with constraints provided by the first poses of the user's face. The weighting adjusts a raw probability distribution of the potential second poses in the probability cloud, concentrating the probability mass on those second poses that are both consistent with the second positions and supported by the first poses.

This approach provides several technical benefits. First, it enables probabilistic reasoning in the presence of ambiguous or incomplete data, allowing the system to represent multiple possible interpretations of the user's face pose rather than forcing a single uncertain choice.

Second, weighting the probability cloud using the first poses of the user's face eliminates implausible estimated poses, suppressing false positives and ensuring that the most consistent second poses are selected.

Third, the weighted probability approach increases robustness against transient noise, poor lighting, or partial occlusion in the second images, because the influence of spurious second poses is diminished while plausible second poses consistent with the first poses are reinforced.

Fourth, this probabilistic approach ensures smooth transitions between the second poses, avoiding abrupt changes or instability when the determination of the second poses based on the second images alone is ambiguous.

In summary, this approach enhances the system's ability to resolve ambiguous second pose estimations by incorporating probabilistic reasoning and weighting based on the first poses. This ensures accurate, stable, and low-latency determination of the second poses, even under uncertain or degraded tracking conditions in AR and autostereoscopic HUD applications.

Moreover, optionally, the system further comprises an HUD. In such a case, the at least one processor is configured to:

determine relative positions of eyes of the user with respect to an image plane of the HUD, based on the second positions of the facial landmark features and the second poses of the user's face;

generate or retrieve images to be displayed via the HUD, based on the relative positions of the eyes of the user with respect to the image plane; and display the images via the HUD.

The relative positions of the eyes may be determined by projecting the second positions of the facial landmark features corresponding to the eyes (for example, the pupils or the eye corners) into the coordinate space of the image plane of the HUD, using the transformation defined by the second poses of the user's face. This projection establishes where the user's eyes are located relative to the HUD's image plane at each instant.

In some implementations, the HUD may be implemented as a transparent display integrated into a windshield of the vehicle. One example of such a transparent display is described in U.S. patent application Ser. No. 18/818,717, titled "Augmenting Reality with Multiscopic See-through Display", which is incorporated herein by reference for illustrative purposes only. In other implementations, the HUD may be implemented as a non-transparent display used in conjunction with an optical combiner integrated into the windshield. In such implementations, the optical combiner is arranged on an optical path of the non-transparent display and an optical path of a real-world light field from a real-world environment.

Once the relative positions of the eyes of the user have been determined, the images are generated or retrieved based on the relative positions. In some implementations, the processor may be configured to generate AR or autostereoscopic images that are spatially corrected according to the user's eye positions. In other implementations, the processor may be configured to retrieve pre-rendered images corresponding to different viewpoints, selecting the most appropriate images based on the relative positions of the user's eyes.

The images are then displayed via the HUD, ensuring that the images are presented with spatial alignment appropriate for the determined relative positions of the eyes of the user. In autostereoscopic HUD implementations, different views may be generated or retrieved for the left and right eyes, based on their relative positions with respect to the image plane, and used to generate an autostereoscopic image to be displayed to create a depth-correct visual experience.

Integrating the HUD with the face tracking system and using the second positions and the second poses for image presentation provides several technical benefits. First, by determining the relative positions of the eyes of the user with respect to the image plane of the HUD, the system ensures that the images displayed via the HUD are spatially aligned with the user's actual viewpoint. This prevents distortions and misalignments that would otherwise degrade the quality of augmented or autostereoscopic content.

Second, dynamically generating or retrieving images based on the determined relative positions allows the HUD to adapt in real time to the user's head and eye movements. This provides a stable visual experience with correct parallax and depth cues, which is critical for autostereoscopic and augmented reality HUD applications.

Third, using the second positions and the second poses determined at the second frame rate ensures low-latency adaptation of HUD imagery, minimizing lag between the user's movement and the visual update. This supports comfort, reduces motion sickness, and enhances usability in safety-critical driving environments.

Fourth, because the system maintains metric accuracy by grounding the second positions in the first positions of the facial landmark features, the images displayed via the HUD retain spatial fidelity, ensuring that graphical overlays (for example, navigation cues or warnings) are correctly registered to the outside world or vehicle context.

In summary, such an integrated face tracking and HUD rendering approach ensures spatially accurate, depth-correct, and low-latency display of images via the HUD, improving safety, usability, and user experience in augmented and autostereoscopic HUD applications.

For illustration purposes, there will now be described how various components of the system can be implemented. The at least one processor of the system controls an overall operation of the system, and is communicably coupled to the at least one in-cabin camera, the at least one monocular camera and, optionally, at least one of: the controllable reflective element, the controllable gimbal, the HUD. Optionally, the at least one processor comprises a processor of the HUD. Alternatively, optionally, the at least one processor of the system comprises a processor of a computing device that is communicably coupled to the HUD. Examples of the computing device include, but are not limited to, a laptop, a desktop, a tablet, a phablet, a personal digital assistant, a workstation, and a console. Additionally or alternatively, optionally, the at least one processor of the system is implemented at least partially as a cloud server (namely, a remote server) that provides a cloud computing service.

It will be appreciated that in some implementations, separate processors may be employed, including at least one first processor communicatively coupled with the at least one in-cabin camera and at least one second processor communicatively coupled with the at least one monocular camera. In such implementations, processing of the first images may be performed by the at least one first processor, while remaining steps may be performed by the at least one second processor. The at least one second processor is communicatively coupled with the at least one first processor, and is configured to receive at least one of: the first images, information indicative of the first positions, information indicative of the first poses, from the at least one first processor. Any latency introduced due to such communication between the separate processors may be compensated using the correlation and loop closure techniques described earlier.

Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera.

Pursuant to embodiments of the present disclosure, different types of autostereoscopic HUDs can be implemented. For example, the HUD can be any one of: hogel-based, lenticular array-based, lenslet array-based, parallax barrier-based.

The image plane of the HUD can be a light-emitting surface of the HUD or an imaginary plane that is parallel to the light-emitting surface, in a case where the HUD is being directly viewed. Alternatively, the image plane can be an imaginary plane in another case where an optical combiner is employed to facilitate a reflected view. The term "image plane" refers to an intended location in space where a virtual object is perceived. This does not require the HUD or other optical elements on its optical path to be physically planar. This definition applies irrespective of the optical configuration of the system, namely:

(i) in a case where a distorted image is displayed on a curved or non-curved display and reflected through a curved combiner, (ii) in a case where an undistorted image is displayed on a non-curved display and reflected through a non-curved combiner, (iii) in a case where an image is displayed on the HUD and viewed directly (without any optical combiner).

The present disclosure also relates to the method as described above. Various embodiments and variants disclosed above, with respect to the aforementioned first aspect, apply mutatis mutandis to the method.

Optionally, the method further comprises selecting the given time period as a time period during which the first poses of the user's face vary by less than a predefined threshold change. Selecting the given time period as one in which the first poses vary by less than the predefined threshold change ensures that correlation is anchored to the first positions determined during stable time periods, reducing the effects of latency mismatches and timestamp jitter. This improves the accuracy and consistency of the second positions and second poses, enabling reliable, low-latency tracking suitable for AR and autostereoscopic HUD applications.

Moreover, optionally, the method further comprises adjusting a scale factor applied to the second positions of the facial landmark features, based on a correlation between the second positions and the first positions of the facial landmark features. Adjusting the scale factor applied to the second positions prevents drift in the monocular estimation by anchoring the second positions to the metrically scaled first positions. This ensures that the second poses derived from the second positions remain depth-accurate and stable, improving the reliability of low-latency tracking for AR and autostereoscopic HUD applications.

Furthermore, in some implementations, the at least one monocular camera is mounted on an adjustable support in the vehicle, wherein the method further comprises:
- detecting when the second positions of the facial landmark features have shifted by more than a predefined threshold shift within a time period shorter than a predefined time period, by correlating the facial landmark features identified in the second images with the first positions of the facial landmark features determined from the first images; and
- when it is detected that the second positions of the facial landmark features have shifted by more than the predefined threshold shift within the time period shorter than the predefined time period,
  - determining an amount of at least one of: a tilt of the adjustable support, a translation of the adjustable support, based on a magnitude and a direction of the shift detected in the second positions of the facial landmark features; and
  - correcting the second positions of the facial landmark features, prior to determining the second poses of the user's face, based on the amount of the at least one of: the tilt, the translation of the adjustable support.

By detecting sudden shifts in the second positions and correcting them based on the tilt or translation of the adjustable support, the method compensates for adjustments in the support without requiring manual recalibration. This ensures that the corrected second positions remain metrically consistent with the first positions, maintaining accuracy and stability of the second poses for reliable, low-latency face tracking.

Moreover, optionally, the method further comprises controlling an orientation of a controllable reflective element relative to the at least one monocular camera, to adjust an optical path of the at least one monocular camera and maintain the user's face within a field of view of the at least one monocular camera, wherein the controllable reflective element is arranged on the optical path of the at least one monocular camera. By controlling the orientation of the controllable reflective element to redirect the optical path of the at least one monocular camera, the method maintains the user's face within the field of view without the need to physically reposition the at least one monocular camera. This reduces mechanical complexity, prevents tracking interruptions, and ensures continuous availability of high-temporal-resolution second images for accurate, low-latency face tracking.

Furthermore, optionally, the method further comprises:
- detecting when the at least one monocular camera is occluded; and
- when it is detected that the at least one monocular camera is occluded, performing at least one of:
  - predicting third poses of the user's face based on the first poses of the user's face determined from the first images;
  - refining at least one of: the first positions of the facial landmark features of the user, the first poses of the user's face, based on previously-collected information indicative of at least one of: a size of the user's head, a shape of the user's face, an average distance of the user's face from the at least one in-cabin camera.

By detecting occlusion of the at least one monocular camera and compensating through prediction and/or refinement, the method ensures that face tracking continues without interruption. This maintains temporal continuity, preserves metric accuracy under degraded conditions, and provides stable low-latency tracking for AR and autostereoscopic HUD applications even when the at least one monocular camera is temporarily unavailable.

Moreover, optionally, determining the second poses of the user's face comprises:
- estimating a plurality of potential second poses of the user's face based on the second positions of the facial landmark features; and
- selecting a subset of the plurality of potential second poses of the user's face as the second poses of the user's face, based on the first poses of the user's face determined from the first images.

By estimating multiple potential second poses and constraining the selection with the first poses, the method resolves monocular ambiguities and eliminates implausible pose estimates. This ensures that the determined second poses remain accurate, stable, and consistent with the user's actual head movement, thereby improving reliability of low-latency face tracking for AR and autostereoscopic HUD applications.

Additionally, optionally, the plurality of potential second poses of the user's face are estimated in a form of a probability cloud, each potential second pose in the probability cloud being assigned a probability of said potential second pose being a correct second pose of the user's face at a given instant of time. In such a case, determining the second poses of the user's face further comprises:
- assigning a corresponding weight to a probability of each potential second pose, based on whether said potential second pose matches a corresponding first pose of the user's face for a same time instant or a nearest time instant;
- calculating a weighted probability of each potential second pose, based on the corresponding weight and the probability of said potential second pose; and
- when selecting the subset of the plurality of potential second poses of the user's face, selecting potential second poses having a highest weighted probability from amongst respective weighted probabilities of the plurality of potential second poses.

By representing the potential second poses as a probability cloud and weighting their probabilities with reference to corresponding first poses, the method suppresses implausible estimates and reinforces those consistent with both the first images and the second images. This probabilistic weighting enhances robustness under noisy or ambiguous conditions, ensuring smooth, accurate, and stable second pose determination suitable for AR and autostereoscopic HUD applications.

Furthermore, optionally, the method further comprises:
determining relative positions of eyes of the user with respect to an image plane of a heads-up display, based on the second positions of the facial landmark features and the second poses of the user's face;
generating or retrieving images to be displayed via the heads-up display, based on the relative positions of the eyes of the user with respect to the image plane; and
displaying the images via the heads-up display.

By determining the relative positions of the user's eyes with respect to the HUD image plane and adapting the images accordingly, the method ensures that displayed images are spatially aligned with the user's actual viewpoint. This dynamic adaptation maintains depth accuracy, parallax consistency, and low latency, thereby supporting safe, stable, and immersive AR and autostereoscopic HUD experiences.

DETAILED DESCRIPTION OF THE DRAWINGS

Figure 1A:
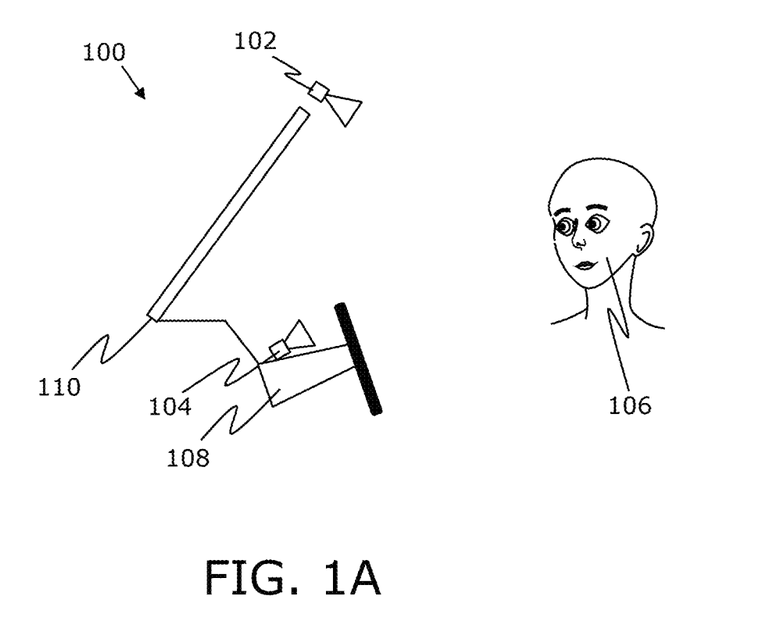
FIG. 1A is a schematic illustration of a system for tracking a face in a vehicle, in accordance with an embodiment of the present disclosure.

FIG. 1A is a schematic illustration of a system 100 for tracking a face in a vehicle, in accordance with an embodiment of the present disclosure. The system 100 comprises at least one in-cabin camera (depicted as an in-cabin camera 102), at least one monocular camera (depicted as a monocular camera 104), and at least one processor (not shown). The in-cabin camera 102 is installed at a predetermined position and orientation in the vehicle, and is configured to capture images of a user at a first frame rate. The monocular camera 104 is configured to capture images of the user at a second frame rate higher than the first frame rate. The at least one processor is configured to:
process first images captured by the in-cabin camera 102 over a given time period, to determine first positions of facial landmark features of the user and first poses of the user's face 106 during the given time period at the first frame rate;
process second images captured by the monocular camera 104 over the given time period, to identify facial landmark features of the user in the second images;
determine second positions of the facial landmark features at the second frame rate, by correlating the facial landmark features identified in the second images with the first positions of the facial landmark features determined from the first images; and
determine second poses of the user's face 106 at the second frame rate based on the second positions of the facial landmark features and the first poses of the user's face during the given time period.

With reference to FIG. 1A, the monocular camera 104 is shown to be mounted on an adjustable support 108 such as a steering column, for illustration purposes only. The system 100 is beneficially employed for determining the second poses of the user's face 106 while the user is seated inside the vehicle and looks through a windshield 110 of the vehicle.

In some implementations, the system 100 further comprises a heads-up display (not shown). The HUD may be implemented as a transparent display integrated into the windshield 110, or as a non-transparent display used in conjunction with an optical combiner integrated into the windshield 110. In such implementations, the at least one processor is configured to:
determine relative positions of eyes of the user with respect to an image plane of the HUD, based on the second positions of the facial landmark features and the second poses of the user's face 106;
generate or retrieve images to be displayed via the HUD, based on the relative positions of the eyes of the user with respect to the image plane; and
display the images via the HUD.

Figure 1B:
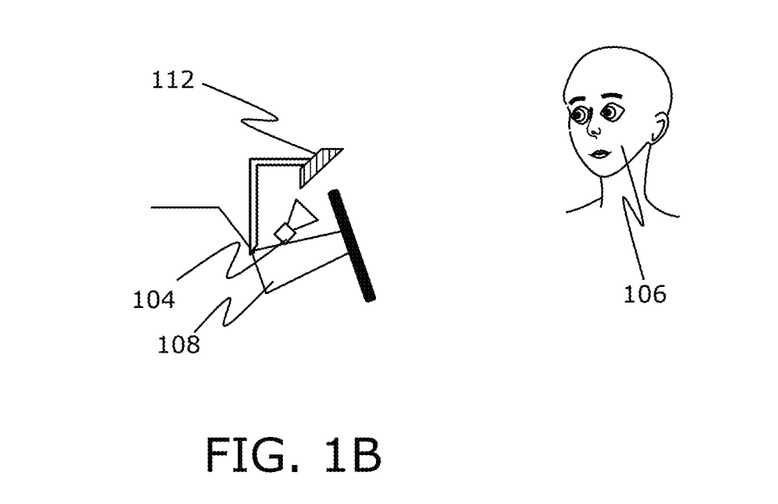
FIG. 1B depicts a specific implementation of the system, in accordance with an embodiment of the present disclosure.

FIG. 1B depicts a specific implementation of the system 100, in accordance with an embodiment of the present disclosure. As shown, the system 100 optionally further comprises a controllable reflective element 112 arranged on an optical path of the monocular camera 104, wherein the at least one processor is configured to control an orientation of the controllable reflective element 112 relative to the monocular camera 104, to adjust the optical path of the monocular camera 104 and maintain the user's face 106 within a field of view of the monocular camera 104. FIG. 1B shows only a part of the system 100, for the sake of simplicity and illustration purposes only.

It may be understood by a person skilled in the art that FIGS. 1A-1B include simplified example implementations of the system 100 and how it works, for sake of clarity, which should not unduly limit the scope of the claims herein. It is to be understood that the specific implementation of the system 100 is not to be construed as limiting it to specific numbers, types or arrangements of in-cabin cameras, monocular cameras, adjustable supports, and controllable reflective elements. The person skilled in the art will recognize many variations, alternatives, and modifications of embodiments of the present disclosure.

Figure 2:
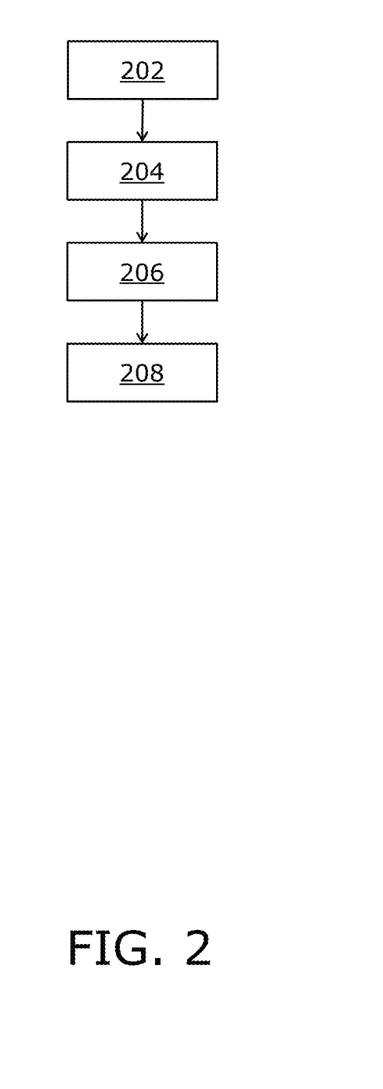
FIG. 2 depicts steps of a method for tracking a face in a vehicle, in accordance with an embodiment of the present disclosure.

Referring to FIG. 2, illustrated are steps of a method for tracking a face in a vehicle, in accordance with an embodiment of the present disclosure. At step 202, first images captured by at least one in-cabin camera at a first frame rate over a given time period are processed, to determine first positions of facial landmark features of a user and first poses of the user's face during the given time period at the first frame rate. The at least one in-cabin camera is installed at a predetermined position and orientation in a vehicle. At step 204, second images captured by at least one monocular camera at a second frame rate over the given time period are processed, to identify facial landmark features of the user in the second images. The at least one monocular camera is installed in the vehicle, the second frame rate being higher than the first frame rate. At step 206, second positions of the facial landmark features are determined at the second frame rate, by correlating the facial landmark features identified in the second images with the first positions of the facial landmark features determined from the first images. At step 208, second poses of the user's face are determined at the second frame rate based on the second positions of the facial landmark features and the first poses of the user's face during the given time period.

The aforementioned steps are only illustrative and other alternatives can also be provided where one or more steps are added, without departing from the scope of the claims herein.

The invention claimed is:

1. A system comprising:
at least one in-cabin camera installed at a predetermined position and orientation in a vehicle, the in-cabin camera being configured to capture images of a user at a first frame rate;
at least one monocular camera installed in the vehicle, the at least one monocular camera being configured to capture images of the user at a second frame rate higher than the first frame rate; and
at least one processor configured to:
process first images captured by the at least one in-cabin camera over a given time period, to determine first positions of facial landmark features of the user and first poses of the user's face during the given time period at the first frame rate;
process second images captured by the at least one monocular camera over the given time period, to identify facial landmark features of the user in the second images;
determine second positions of the facial landmark features at the second frame rate, by correlating the facial landmark features identified in the second images with the first positions of the facial landmark features determined from the first images; and
determine second poses of the user's face at the second frame rate based on the second positions of the facial landmark features and the first poses of the user's face during the given time period.

2. The system of claim 1, wherein the at least one processor is configured to select the given time period as a time period during which the first poses of the user's face vary by less than a predefined threshold change.

3. The system of claim 1, wherein the at least one processor is configured to adjust a scale factor applied to the second positions of the facial landmark features, based on a correlation between the second positions and the first positions of the facial landmark features.

4. The system of claim 1, wherein the at least one monocular camera is mounted on an adjustable support in the vehicle, wherein the at least one processor is configured to:
detect when the second positions of the facial landmark features have shifted by more than a predefined threshold shift within a time period shorter than a predefined time period, by correlating the facial landmark features identified in the second images with the first positions of the facial landmark features determined from the first images; and
when it is detected that the second positions of the facial landmark features have shifted by more than the predefined threshold shift within the time period shorter than the predefined time period,
determine an amount of at least one of: a tilt of the adjustable support, a translation of the adjustable support, based on a magnitude and a direction of the shift detected in the second positions of the facial landmark features; and
correct the second positions of the facial landmark features, prior to determining the second poses of the user's face, based on the amount of the at least one of: the tilt, the translation of the adjustable support.

5. The system of claim 1, further comprising a controllable reflective element arranged on an optical path of the at least one monocular camera, wherein the at least one processor is configured to control an orientation of the controllable reflective element relative to the at least one monocular camera, to adjust the optical path of the at least one monocular camera and maintain the user's face within a field of view of the at least one monocular camera.

6. The system of claim 1, wherein the at least one processor is configured to:
detect when the at least one monocular camera is occluded; and
when it is detected that the at least one monocular camera is occluded, perform at least one of:
predicting third poses of the user's face based on the first poses of the user's face determined from the first images;
refining at least one of: the first positions of the facial landmark features of the user, the first poses of the user's face, based on previously-collected information indicative of at least one of: a size of the user's head, a shape of the user's face, an average distance of the user's face from the at least one in-cabin camera.

7. The system of claim 1, wherein when determining the second poses of the user's face, the at least one processor is configured to:
estimate a plurality of potential second poses of the user's face based on the second positions of the facial landmark features; and
select a subset of the plurality of potential second poses of the user's face as the second poses of the user's face, based on the first poses of the user's face determined from the first images.

8. The system of claim 7, wherein the plurality of potential second poses of the user's face are estimated in a form of a probability cloud, each potential second pose in the probability cloud being assigned a probability of said potential second pose being a correct second pose of the user's face at a given instant of time, and
wherein when determining the second poses of the user's face, the at least one processor is configured to:
assign a corresponding weight to a probability of each potential second pose, based on whether said potential second pose matches a corresponding first pose of the user's face for a same time instant or a nearest time instant;
calculate a weighted probability of each potential second pose, based on the corresponding weight and the probability of said potential second pose; and
when selecting the subset of the plurality of potential second poses of the user's face, select potential second poses having a highest weighted probability from amongst respective weighted probabilities of the plurality of potential second poses.

9. The system of claim 1, further comprising a heads-up display, wherein the at least one processor is configured to:
determine relative positions of eyes of the user with respect to an image plane of the heads-up display, based on the second positions of the facial landmark features and the second poses of the user's face;
generate or retrieve images to be displayed via the heads-up display, based on the relative positions of the eyes of the user with respect to the image plane; and
display the images via the heads-up display.

10. A method comprising:
processing first images captured by at least one in-cabin camera at a first frame rate over a given time period, to determine first positions of facial landmark features of a user and first poses of the user's face during the given time period at the first frame rate, wherein the at least one in-cabin camera is installed at a predetermined position and orientation in a vehicle;

processing second images captured by at least one monocular camera at a second frame rate over the given time period, to identify facial landmark features of the user in the second images, wherein the at least one monocular camera is installed in the vehicle, the second frame rate being higher than the first frame rate;

determining second positions of the facial landmark features at the second frame rate, by correlating the facial landmark features identified in the second images with the first positions of the facial landmark features determined from the first images; and determining second poses of the user's face at the second frame rate based on the second positions of the facial landmark features and the first poses of the user's face during the given time period.

11. The method of claim 10, further comprising adjusting a scale factor applied to the second positions of the facial landmark features, based on a correlation between the second positions and the first positions of the facial landmark features.

12. The method of claim 10, wherein the at least one monocular camera is mounted on an adjustable support in the vehicle, the method further comprising:

detecting when the second positions of the facial landmark features have shifted by more than a predefined threshold shift within a time period shorter than a predefined time period, by correlating the facial landmark features identified in the second images with the first positions of the facial landmark features determined from the first images; and when it is detected that the second positions of the facial landmark features have shifted by more than the predefined threshold shift within the time period shorter than the predefined time period, determining an amount of at least one of: a tilt of the adjustable support, a translation of the adjustable support, based on a magnitude and a direction of the shift detected in the second positions of the facial landmark features; and correcting the second positions of the facial landmark features, prior to determining the second poses of the user's face, based on the amount of the at least one of: the tilt, the translation of the adjustable support.

13. The method of claim 10, further comprising:

detecting when the at least one monocular camera is occluded; and when it is detected that the at least one monocular camera is occluded, performing at least one of:

predicting third poses of the user's face based on the first poses of the user's face determined from the first images;

refining at least one of: the first positions of the facial landmark features of the user, the first poses of the user's face, based on previously-collected information indicative of at least one of: a size of the user's head, a shape of the user's face, an average distance of the user's face from the at least one in-cabin camera.

14. The method of claim 10, wherein determining the second poses of the user's face comprises:

estimating a plurality of potential second poses of the user's face based on the second positions of the facial landmark features; and selecting a subset of the plurality of potential second poses of the user's face as the second poses of the user's face, based on the first poses of the user's face determined from the first images.

15. The method of claim 14, wherein the plurality of potential second poses of the user's face are estimated in a form of a probability cloud, each potential second pose in the probability cloud being assigned a probability of said potential second pose being a correct second pose of the user's face at a given instant of time, and wherein determining the second poses of the user's face further comprises:

assigning a corresponding weight to a probability of each potential second pose, based on whether said potential second pose matches a corresponding first pose of the user's face for a same time instant or a nearest time instant;

calculating a weighted probability of each potential second pose, based on the corresponding weight and the probability of said potential second pose; and when selecting the subset of the plurality of potential second poses of the user's face, selecting potential second poses having a highest weighted probability from amongst respective weighted probabilities of the plurality of potential second poses.

* * * * *